United States Patent [19]
Sugata et al.

[11] Patent Number: 5,995,701
[45] Date of Patent: Nov. 30, 1999

[54] OPTICAL-FIBER ENVIRONMENT VARIABLE APPARATUS, OPTICAL-FIBER EXTRACTING APPARATUS, AND OPTICAL-FIBER EXTRACTING SYSTEM

[75] Inventors: Masami Sugata; Eiichi Ishino; Yuzo Sato, all of Tokyo, Japan

[73] Assignee: Ono Sokki Co., Ltd., Japan

[21] Appl. No.: 08/971,368

[22] Filed: Nov. 17, 1997

[30] Foreign Application Priority Data

Nov. 18, 1996 [JP] Japan ..................................... 8-306645
Oct. 21, 1997 [JP] Japan ..................................... 9-288513

[51] Int. Cl.$^6$ ..................................................... G02B 6/00
[52] U.S. Cl. ........................................... 385/147; 162/238
[58] Field of Search ..................................... 385/147, 138, 385/99, 12; 162/238, 233, 252, 263; 356/350, 44; 264/1.28, 1.24, 40.7; 374/43; 73/295, 714, 861.05, 861.22

[56] References Cited

U.S. PATENT DOCUMENTS

| | | |
|---|---|---|
| 4,621,929 | 11/1986 | Phillips ..................................... 356/44 |
| 4,814,116 | 3/1989 | Oestreich et al. ...................... 264/1.28 |
| 5,208,652 | 5/1993 | Sonobe et al. ........................... 356/350 |
| 5,515,473 | 5/1996 | Yamauuchi et al. ..................... 385/138 |
| 5,547,545 | 8/1996 | Egi et al. ................................. 162/238 |

*Primary Examiner*—Akm E. Ullah
*Attorney, Agent, or Firm*—Lorusso & Loud

[57] ABSTRACT

To enable extraction of one specific optical fiber from a plurality of optical fibers at remote sites. An environment variable apparatus is mounted to provide a temperature difference at a predetermined position of an optical fiber. An environment variable apparatus is mounted to detect scattered light of light incident on the optical fiber through one end thereof so as to extract a target optical fiber from a large member of optical fibers. Further, synchronous devices are mounted to transmit from the environment variable apparatus to the extracting apparatus a message in that the temperature difference is given to the optical fiber, and transmit from the extracting apparatus to the environment variable apparatus a decision signal as to whether or not the optical fiber is to be extracted.

14 Claims, 7 Drawing Sheets

OPTICAL-FIBER ENVIRONMENT VARIABLE APPARATUS, OPTICAL-FIBER EXTRACTING APPARATUS, AND OPTICAL-FIBER EXTRACTING SYSTEM

BACKGROUND OF THE INVENTION

1. Field of the Invention

This invention relates to an optical-fiber environment variable apparatus, an optical-fiber extracting apparatus, and an optical-fiber extracting system in which one specific optical fiber may be extracted from a large number of optical fibers at remote sites.

2. Description of the Prior Art

FIG. 5 is a diagram showing a state of optical fibers installed for communication.

The optical fibers 1 are passed from repeater to repeater (not shown) which are mounted at intervals of about 2 km from a communication equipment 3 in facilities 2. Between the repeaters, manholes 4 are provided at intervals of L (about 250 m) for maintenance and inspection of the state of installed fibers.

One cable with a diameter of 5.5 mm forms a fiber bundle including 3,000 pieces of optical fibers 1. Further, 10 to 20 pieces of cables are disposed in a cable duct.

In works of removing an unnecessary optical fiber from a large number of optical fibers 1 (1A, 1B, . . . , IN) which have already been installed, or diverging an optical fiber from an already-installed optical fiber cable, or shifting an optical fiber to another place due to the occurrence of difficulty, it is very difficult to detect the target optical fiber out of the large number of optical fibers.

If another optical fiber is erroneously broken during communication, a failure may occur in an online system, resulting in a serious effect on society.

SUMMARY OF THE INVENTION

It is an object of the present invention to provide an optical-fiber environment variable apparatus, an optical-fiber extracting apparatus, and an optical-fiber extracting system in which one specific optical fiber may be extracted from a plurality of optical fibers at remote sites.

In order to overcome the above problems, according to the invention as defined in claim 1, there is provided an optical-fiber environment variable apparatus in which a temperature difference is provided at a predetermined position of an optical fiber to detect scattered light of light incident on the optical fiber through one end thereof so as to extract a target optical fiber from a large number of optical fibers. Further, the apparatus comprises a heat transmission portion to circumferentially grip or cover the optical fiber, a temperature difference generating portion to increase or decrease an ambient temperature of the heat transmission portion, a temperature setting portion to set the temperature difference given to the optical fiber, a temperature detecting portion to detect an ambient temperature of the optical fiber, and a control portion to control the temperature difference generating portion such that the temperature detected in the temperature detecting portion becomes a temperature set in the temperature setting portion.

According to the invention as defined in claim 2, there is provided an optical-fiber extracting apparatus in which a temperature difference is provided at a predetermined position of an optical fiber to detect scattered light of light incident on the optical fiber through one end thereof so as to extract a target optical fiber from a large number of optical fibers. Further, the apparatus comprises a light emitting portion to provide an optical signal to be incident on the optical fiber through one end thereof, a photoreceptive portion to receive a scattered light generated by the temperature difference caused at the predetermined position of the optical fiber, and an extraction decision portion to decide whether or not the optical fiber is to be extracted depending upon the optical signal received by the photoreceptive portion.

According to the invention as defined in claim 3, there is provided an optical-fiber extracting system comprising an optical-fiber environment variable apparatus to provide a temperature difference at a predetermined position of an optical fiber, and an optical-fiber extracting apparatus to detect scattered light of light incident on the optical fiber through one end thereof so as to extract the optical fiber having the temperature difference from a large number of optical fibers.

According to the invention as defined in claim 4, there is provided an optical-fiber extracting system according to claim 3, wherein it further comprises the optical-fiber environment variable apparatus according to claim 1.

According to the invention as defined in claim 5, there is provided an optical-fiber extracting system according to claim 3 or 4, wherein it further comprises the optical-fiber extracting apparatus according to claim 2.

According to the invention as defined in claim 6, there is provided an optical-fiber extracting system according to any one of claims 3 to 5, wherein it further comprises a synchronous device to transmit from the environment variable apparatus to the extracting apparatus a message in that the temperature difference is given to the optical fiber, and transmit from the extracting apparatus to the environment variable apparatus a decision signal as to whether or not the optical fiber is to be extracted.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENTS

Figure 1:
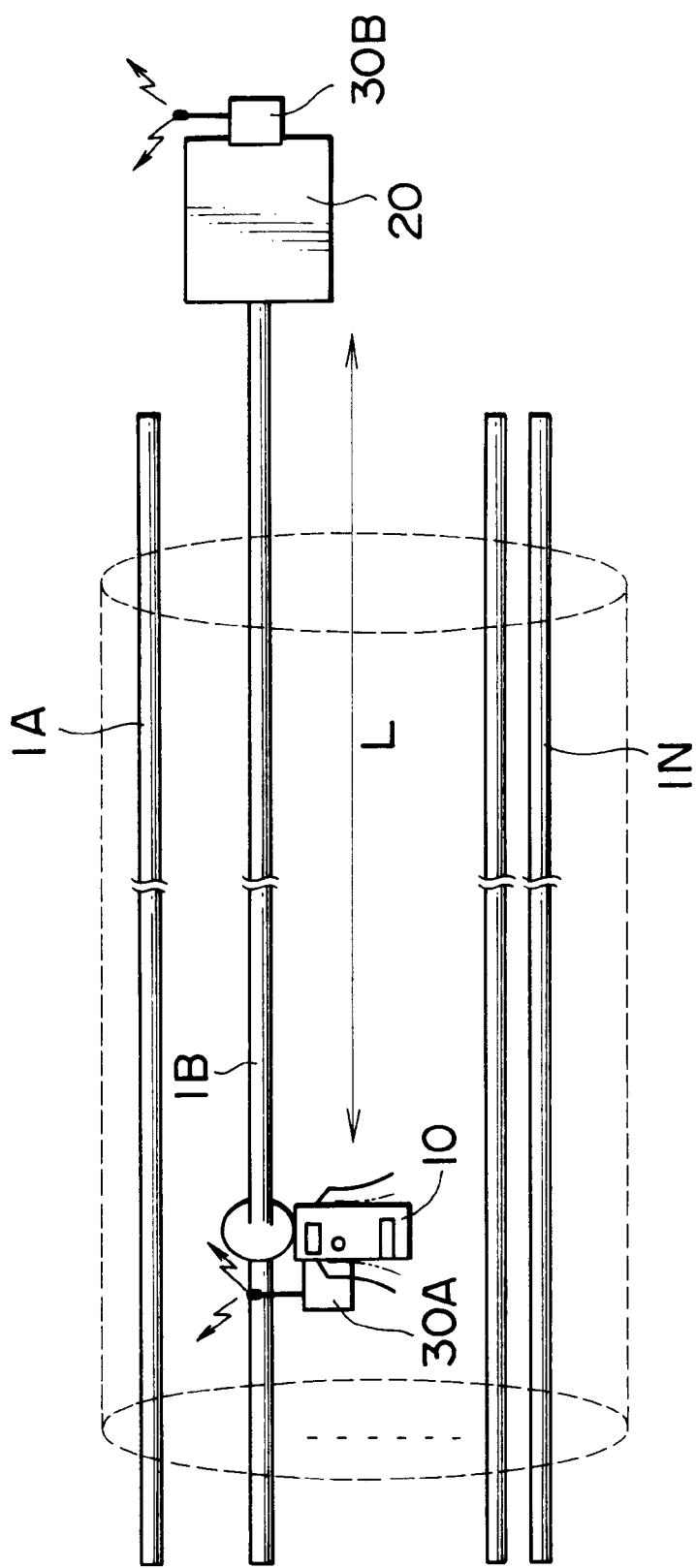
FIG. 1 is a general drawing showing an embodiment of an optical-fiber extracting system according to the present invention.

FIG. 1 is a general drawing showing an embodiment of an optical-fiber extracting system according to the present invention.

In the embodiment, the extracting system comprises an environment variable apparatus 10, an extracting apparatus 20, synchronous devices 30A and 30B, and so forth.

The environment variable apparatus 10 varies a temperature environment (i.e., increases or decreases the temperature) of a selected position of an optical fiber 1 to be extracted.

The extracting apparatus 20 transmits a laser pulse signal to the optical fiber 1, and receives Raman scattered light caused by the variation in environment if the environment of the optical fiber 1 is varied by the environment variable apparatus 10. It is thereby decided in the extracting apparatus 20 whether or not the optical fiber 1 is to be extracted.

The synchronous devices 30A, 30B carry out transmission and reception of a signal between the environment variable apparatus 10 and the extracting apparatus 20.

Figure 2:
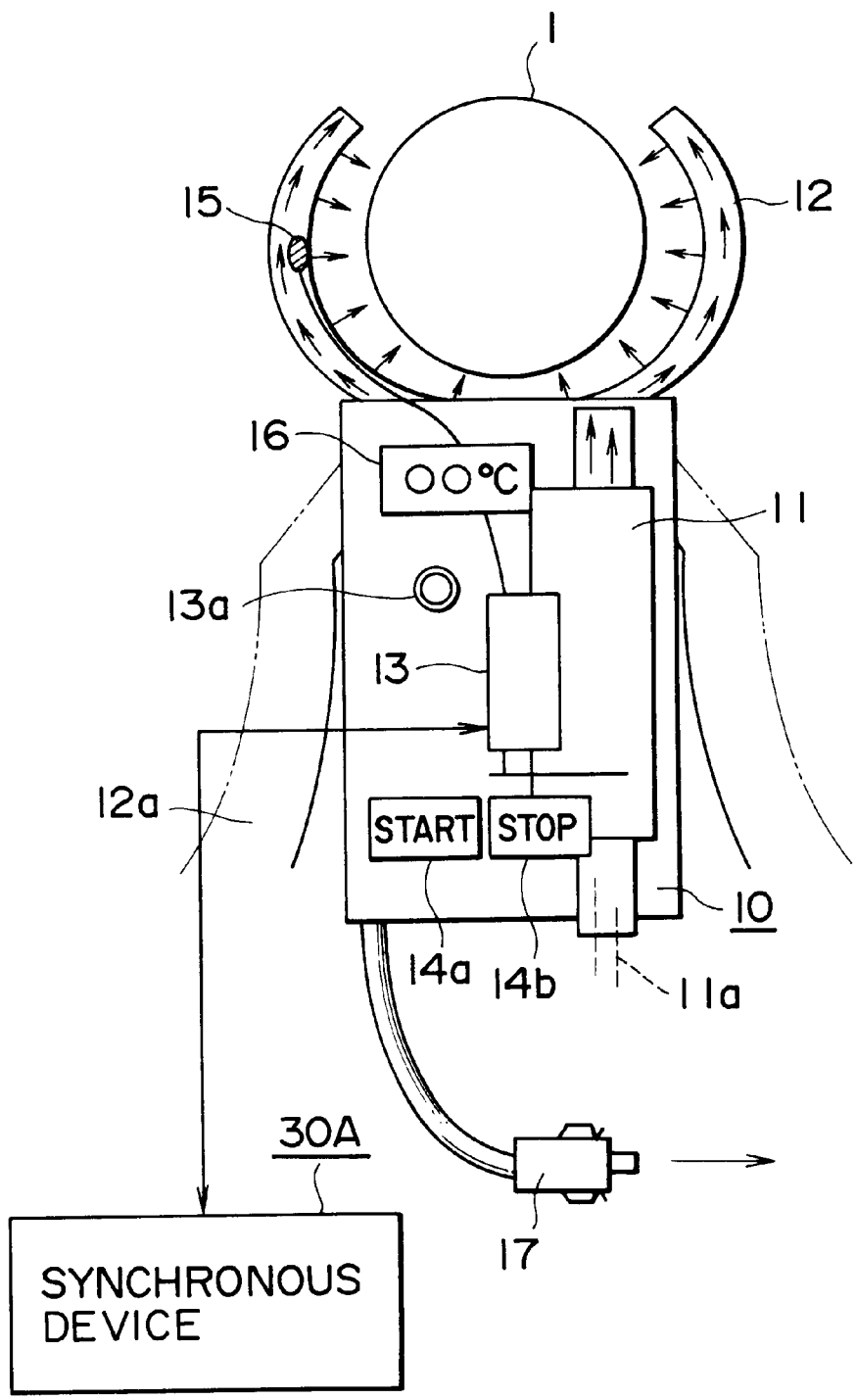
FIG. 2 is a diagram showing an environment variable apparatus according to the embodiment.

FIG. 2 is a diagram showing the environment variable apparatus according to the embodiment.

The environment variable apparatus 10 comprises a hot-air generator 11, a hot-air conduit 12, a control portion 13, a start/stop switch 14, a temperature detector 15, an indicating portion 16, a power source portion 17, and so forth.

The hot-air generator 11 serves as a temperature difference generating source to increase an environmental temperature of the optical fiber 1 so as to increase a temperature of the optical fiber itself in a short time. The hot-air generator 11 increases a temperature of air taken through an air inlet 11a, and introduces the air into the hot-air conduit 12.

The hot-air conduit 12 serves as a conduit through which the hot air from the hot-air generator 11 may efficiently be transmitted to the optical fiber 1. The hot-air conduit 12 may be opened and closed with a body-mount portion as a center. An operator may grip the optical fiber 1 to be extracted by gripping a grip portion 12a. In the hot-air conduit 12, an appropriate hole is provided in a portion in contact with the optical fiber 1 such that the hot-air may directly be sprayed on the optical fiber 1.

The control portion 13 controls the temperature generated by the hot-air generating portion 12. The control portion 13 is connected to a setting knob 13a to set the temperature, the start/stop switch 14 to instruct start-stop operations of a temperature control, the temperature detector 15 to detect the temperature of the hot-air conduit 12, the indicating portion 16 to indicate a preset temperature and/or a detected temperature, and so forth.

The power source portion 18 supplies power to the apparatus. In the embodiment, it will be appreciated that a cigarette lighter outlet is provided in an operation car.

Figure 3:
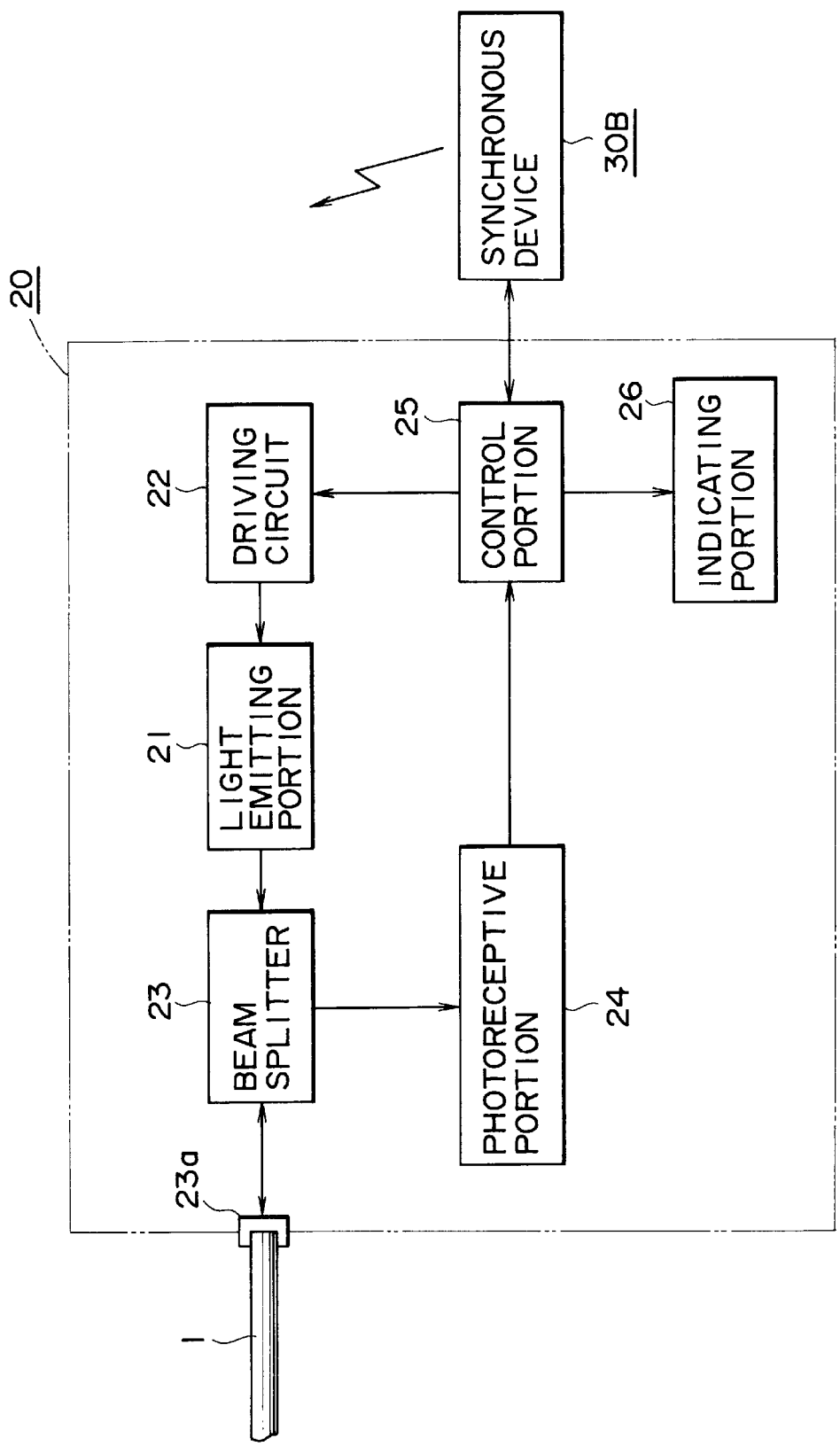
FIG. 3 is a block diagram showing an extracting apparatus according to the embodiment.

FIG. 3 is a block diagram showing the extracting apparatus according to the embodiment.

The extracting apparatus 20 comprises a light emitting portion 21, a driving circuit 22, a beam splitter 23, a photoreceptive portion 24, a control portion 25, an indicating portion 26, and so forth.

The light emitting portion 21 generates a laser pulse having a predetermined width by using a semiconductor laser or the like, and is driven by a signal from the driving circuit 22. The laser pulse generated from the light emitting portion 21 is sent to the optical fiber 1 connected to a connector portion 23a through the beam splitter 23.

The photoreceptive portion 24 to receive the Raman scattered light from the optical fiber 1 includes a photoelectric converting element such as avalanche photodiode, a filter to extract an anti-Stokes light component of the Raman scattered light, and so forth. The photoreceptive portion 24 receives the Raman scattered light split from the optical fiber 1 by the beam splitter 23.

The control portion 25 controls the driving circuit 22, and performs A/D conversion of a signal from the photoreceptive portion 24, thereafter making a decision depending upon the signal as to whether or not the optical fiber 1 is to be extracted. The control portion 25 is connected to the indicating portion 46 to indicate the result of decision, and the synchronous device 30B.

Figure 4:
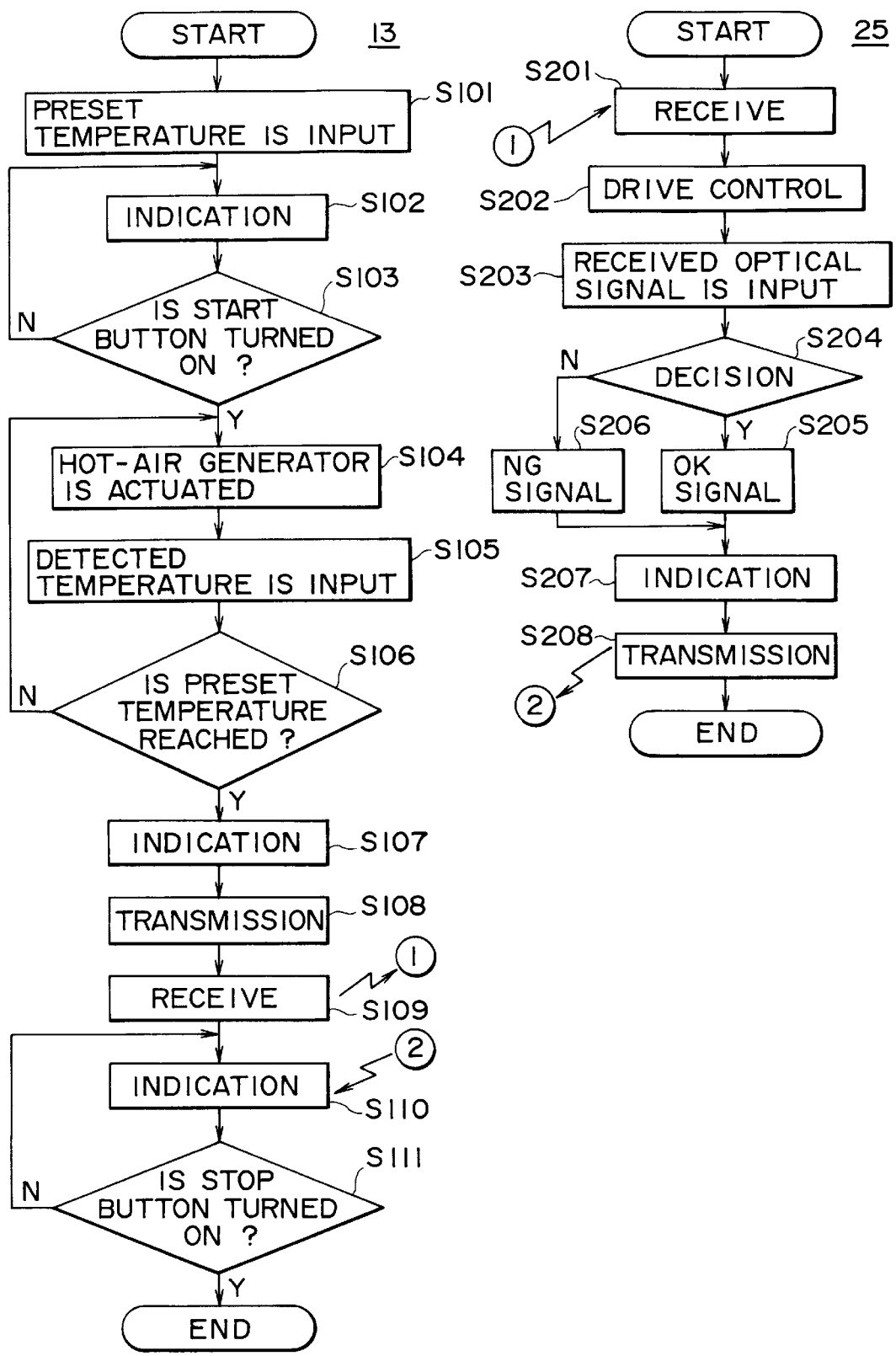
FIG. 4 is a flowchart showing the operation in the embodiment of the optical-fiber extracting system according to the present invention.
Figure 5:
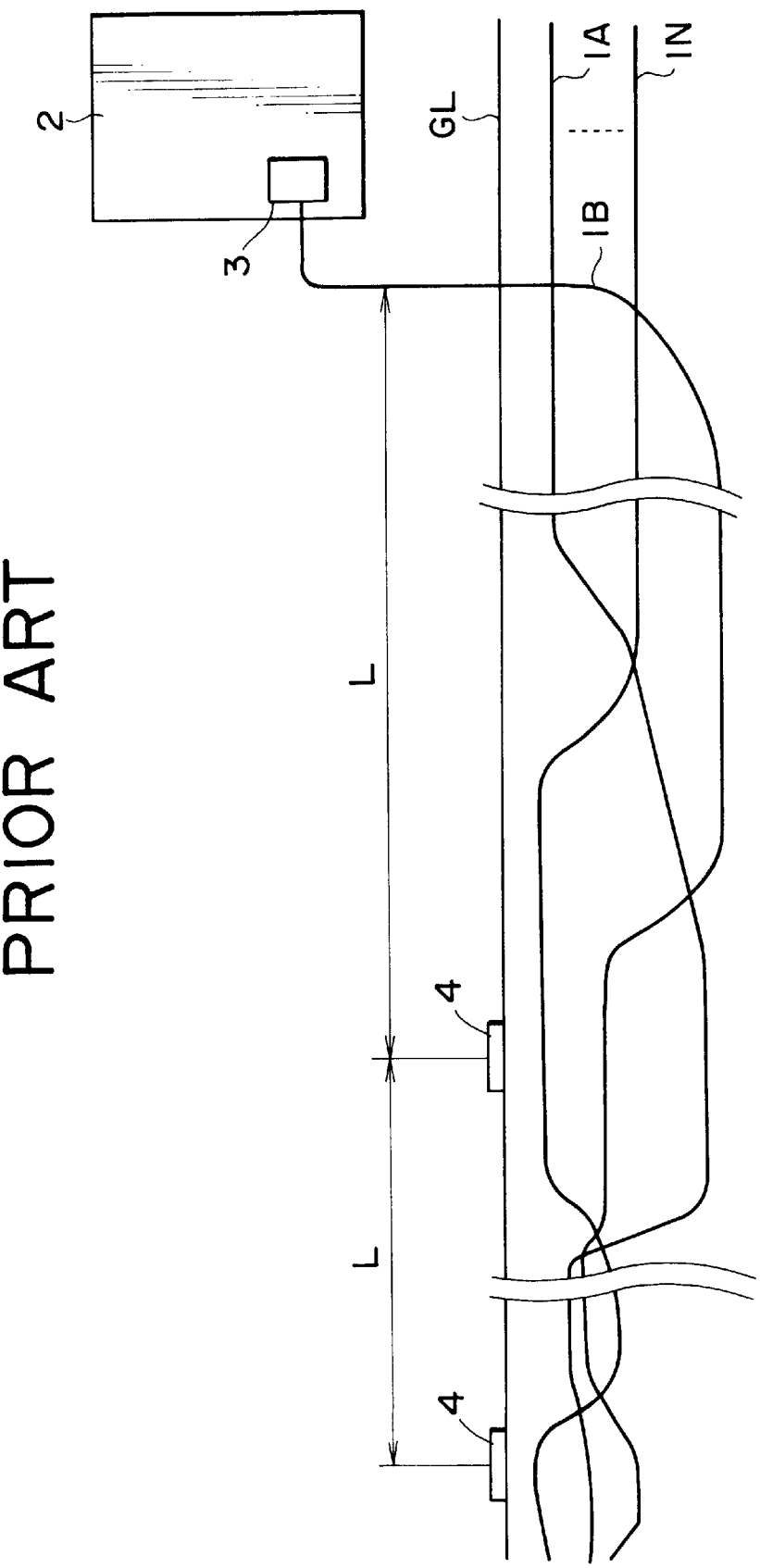
FIG. 5 is a diagram showing a state of optical fibers installed for communication in a prior art.

FIG. 4 is a flowchart showing the operation in the embodiment of the optical-fiber extracting system according to the present invention.

The flow is executed by the control portion 13 of the environment variable apparatus 10, and the control portion 25 of the extracting apparatus 20.

First, it is necessary to previously complete preparatory work in which, for example, the optical fiber 1 is held by the hot-air conduit 12 of the environment variable apparatus 10, and the temperature is set by the setting knob 13a to provide a sufficiently detectable environmental temperature according to the season or the like.

When a preset temperature is input in the control portion 13 (S101), the indicating portion 16 indicates the preset temperature (S102).

In this state, the control portion 13 waits until a start button 14a is turned ON (S103). When turned ON, the control portion 13 actuates the hot-air generator 11 (S104) to introduce the hot air into the hot-air conduit 12.

After the temperature of the optical fiber 1 is increased, the temperature detector 15 detects the temperature. When the control portion 13 takes as input the detected temperature from the temperature detector 15 (S105), it is decided whether or not the detected temperature reaches the preset temperature (S106). If the preset temperature is reached, the control portion 13 causes the indicating portion 16 to indicate a message to this effect, and transmits an emission start instructing signal to the extracting apparatus 20 through the synchronous devices 30A, 30B (S108).

On the other hand, when the control portion 25 of the extracting apparatus 20 receives the emission start instructing signal (S201), the control portion 25 outputs a control signal to the driving circuit 22 such that the light emitting portion 21 outputs the laser pulse signal to the optical fiber 1.

Thereafter, the control portion 25 takes as input an optical signal received from the photoreceptive portion 24 (S203). It is decided whether or not the signal (corresponding to intensity of the anti-Stockes light component of the Raman scattered light) has a predetermined level or more (S204). In case of the predetermined level or more, the control portion 25 generates an OK signal (S205). Otherwise, the control portion 25 generates an NG signal (S206), and causes the indicating portion 26 to indicate the result (S207).

Further, the result of decision is transmitted to the environment variable apparatus 10 through the synchronous devices 30B, 30A (S208), resulting in completion of the sequence of operations.

The control portion 13 of the environment variable apparatus 10 receives the result of decision (S109), and causes the indicating portion 16 to indicate the result (S110). The operator checks the result depending upon the indication, and thereafter presses a stop button 14b (S111), thereby terminating the operation.

When the result of decision is OK, it is shown that the optical fiber 1 is the target optical fiber to be extracted. Thus, the operator may carry out operations such as extraction. In case of NG, it is shown that the optical fiber 1 is not the target optical fiber. Consequently, the operator repeats the same operations as those described above with respect to the next optical fiber 1.

FIG. 6 is a view showing an optical-fiber environment variable apparatus as a second embodiment of the present invention. FIG. 7 is a sectional view for explaining the state of the second embodiment in use.

Figure 6A:
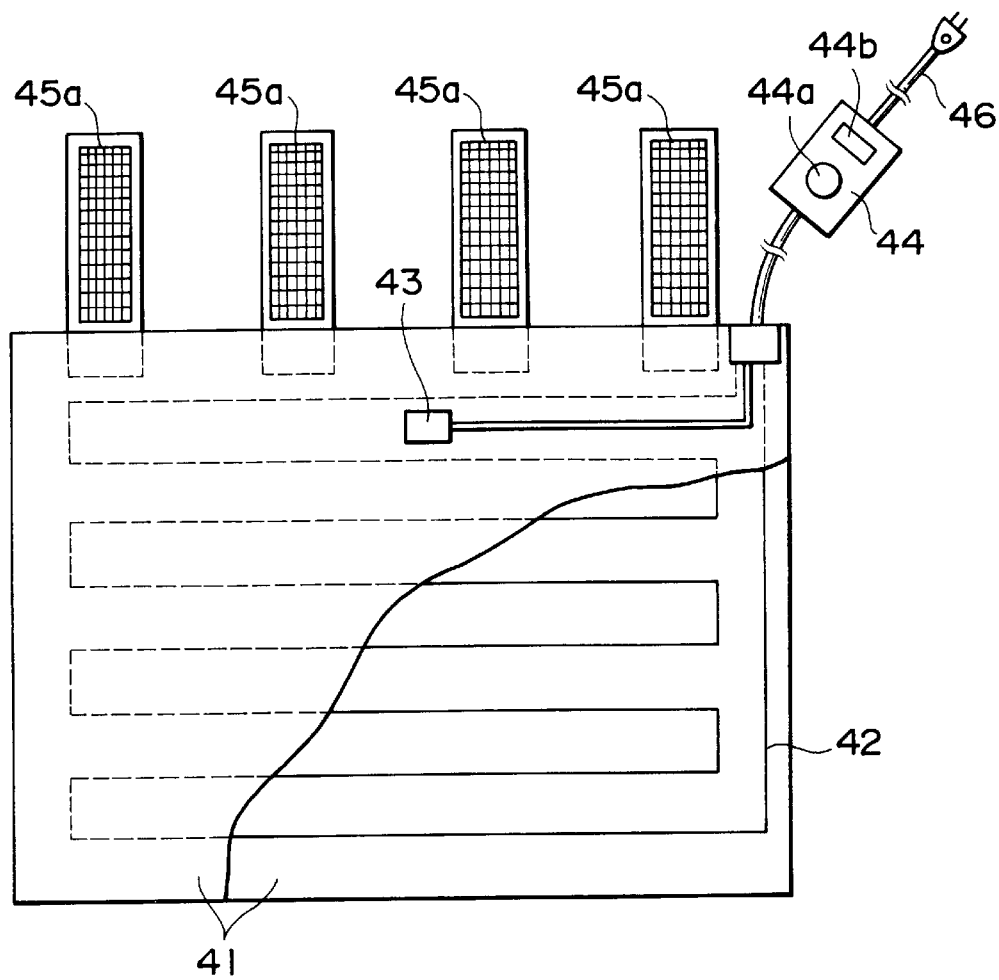
FIG. 6 is a view showing an optical-fiber environment variable apparatus as a second embodiment of the present invention.

As shown in FIG. 6(A), the environment variable apparatus in the second embodiment comprises a flexible planar cover 41 for circumferentially covering the optical fiber 1, a heating element 42, in which Nichrome wire to increase the temperature of the planar cover 41 is insulated with a glass fiber, a temperature sensor 43 such as a thermocouple provided in the approximately center of the inside of the planar cover 41 to detect the ambient temperature of the optical fiber 1, a temperature controller 44 having a temperature adjusting dial 44a and a temperature indicating portion 44b to control the temperature of the heating element 42 on the basis of the temperature detected in the temperature sensor 43, a fastening member 45 including planar fasteners 45a, 45b or the like to fasten and fix the planar cover 41, a cord 46 to supply power source, and so forth.

Figure 6B:
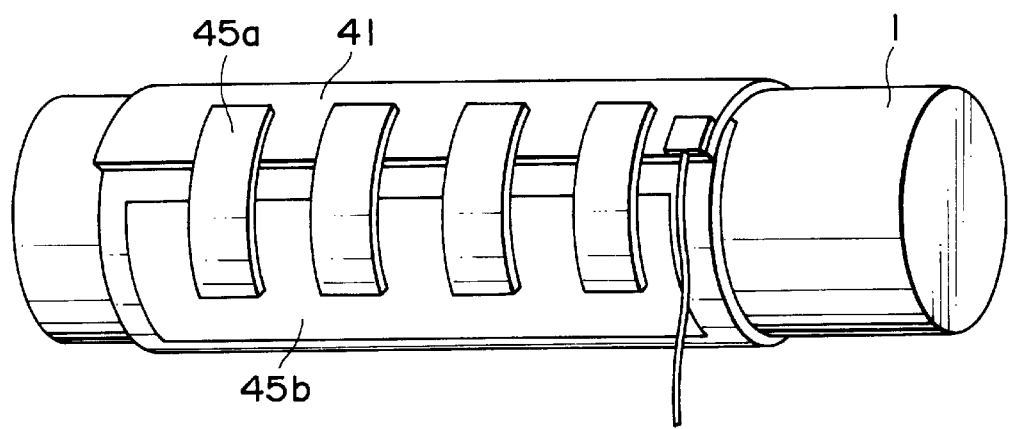

As shown in FIG. 6(B), the planar cover 41 is wound around the optical fiber 1, and fastened and fixed by the fastening member 45. When the temperature is set by turning the temperature adjusting dial 44a, the temperature controller 44 causes the indicating portion 44b to indicate the set temperature, and allows the heating element 42 to generate heat. When the temperature detected in the temperature sensor 43 reaches the set temperature, the temperature controller allows the heating element 42 to stop generation of heat.

Figure 7A:
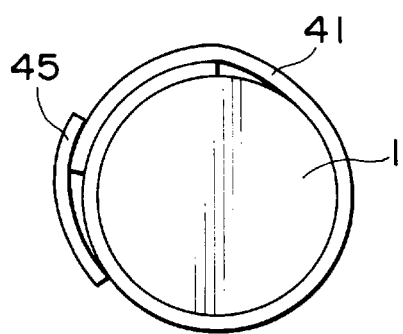
FIG. 7 is a sectional view for explaining the state of the environment variable apparatus as the second embodiment in use.

As shown in FIG. 7(A), when a thin optical fiber 1 is used, the planar cover 41 is wound around the thin optical fiber such as to lap over the ends of the cover, and then fixed by the fastening member 45.

Figure 7B:
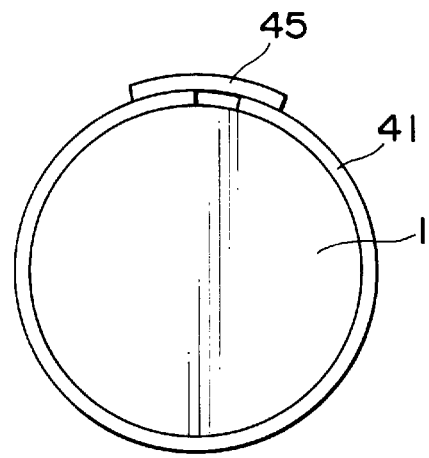

On the other hand, as shown in FIG. 7(B), when a thick optical fiber 1 is used, a slight gap is formed between the ends of the planar cover 41. However, even in this case, it is possible to sufficiently heat by fixing the planar cover 41 by the fastening member 45.

According to the second embodiment, since the planar cover 41 is flexible and may be brought into close contact with the optical fiber 1, it is possible to heat a portion of a required light at once.

Further, since the fastening member 45 is easily attached to the planar cover for fastening and also easily removed from the planar cover, it is possible to enhance working efficiency.

Furthermore, even if the optical fibers 1 are various in outer diameter to some degrees, it is possible to cope with this case by adjusting the inner diameter of the planar cover 41 according to a way of winding.

It will be appreciated that the present invention should not be limited to the embodiment described above, and various modifications and changes may be made without departing from the scope of the present invention.

For example, concerning a heater, hot air may be generated by a small-sized gas burner or the like, or electromagnetic wave may be employed for heating.

Though the embodiment has been described with respect to a case where the optical fiber is heated, it is to be noted that scattered light may be generated by cooling the optical fiber.

Further, it must be noted that the optical signal received in the photoreceptive portion may be Stokes light of the Raman scattered light, or both of the Stokes light and the anti-Stokes light. In the latter case, a noise component may be canceled by determining the ratio of both received optical signals.

Though the embodiment has been described with respect to a case where the decision signal is sent between the environment variable apparatus and the extracting apparatus through the synchronous device, it is to be noted that the result of decision indicated in the indication portion 26 may be sent between the environment variable apparatus and the extracting apparatus through a communication device such as a portable telephone.

Further, it is to be noted that a plurality of environment variable apparatuses may be arranged at predetermined intervals (for instance, 250 m) for decision of the optical fiber to be extracted in all the sections through operation of the extracting apparatus at once. Incidentally, in case of work using a single environment variable apparatus, when the confirmed optical fiber is cut on all such occasions, it is preferable that the work is started from the side remotest from the extracting apparatus.

As specifically stated above, according to the present invention, there is an effect in the one specific optical fiber may easily be extracted from a plurality of optical fibers.

Further, since a synchronous device is added, it is possible to enhance operability, reduce an operating time, and realize an accurate extracting.

What is claimed is:

1. An optical-fiber environment variable apparatus in which a temperature difference is provided at a predetermined position of an optical fiber to detect scattered light of light incident on the optical fiber through one end thereof so as to extract a target optical fiber from a large number of optical fibers, comprising:

a heat-transmission portion to circumferentially grip or cover the optical fiber;

a temperature difference generating portion to increase or decrease an ambient temperature of said heat transmission portion;

a temperature setting portion to set the temperature difference given to said optical fiber;

a temperature detecting portion to detect the ambient temperature of said optical fiber; and a control portion to control said temperature difference generating portion such that the temperature detected in said temperature detecting portion becomes a temperature set in said temperature setting portion.

2. A device for creating a temperature differential in an elongated optical fiber by localized change of temperature in a set length of the optical fiber, said device comprising:

heat transmitting means for gripping or covering the set length of the optical fiber;

temperature difference generating means for changing the temperature of the set length relative to remaining portions of the optical fiber by heat exchange through said heat transmitting means;

temperature setting means for setting a desired localized temperature;

temperature detection means for detecting the temperature of the set length; and control means for controlling said heat transmitting means so that the detected temperature becomes equal to the set localized temperature.

3. The device of claim 2 housed within a hand-held case.

4. The device of claim 2 wherein said temperature difference generating means includes an electrical heating element.

5. The device of claim 4 wherein:

said temperature difference generating means further includes an air blower for passing air over said heating element; and said heat transmitting means includes a pair of conduits for gripping the optical fiber therebetween and for exhausting the hot air onto the set length of the optical fiber.

6. A phototransmitter/receiver for identifying, at a remote location, a target fiber from among a large number of optical fibers, with light scattering being produced in a selected one of said optical fibers at the remote location, said phototransmitter/receiver comprising:

light transmitting means for transmitting an optical signal from one end of a given one of the optical fibers to the remote location;

photoreceiver means for receiving scattered light from the given one optical fiber; and decision means for deciding, based on the received scattered light, whether or not the given one optical fiber is the target fiber.

7. Apparatus for identifying, at a remote location, a target fiber from among a large number of optical fibers, said apparatus comprising:

heat exchange means for changing the temperature of a set length of one of the optical fibers, at the remote location, relative to remaining portions of that one optical fiber to produce light scattering within the one optical fiber; and detection means for detecting the scattered light through one end of the one optical fiber to identify the one optical fiber in which the light scattering is produced at the remote location, said remote location being remote from said one end.

8. The apparatus of claim 7 wherein said heat exchange means comprises:

heat transmitting means for gripping or covering the set length of the optical fiber;

temperature difference generating means for changing the temperature of the set length relative to remaining portions of the optical fiber by heat exchange through said heat transmitting means;

temperature setting means for setting a desired localized temperature;

temperature detection means for detecting the temperature of the set length; and control means for controlling said heat transmitting means so that the detected temperature becomes equal to the set temperature.

9. The apparatus of claim 8 wherein said detection means comprises:

light transmitting means for transmitting an optical signal from one end of the one optical fiber to the remote location;

photoreceiver means for receiving scattered light from the one optical fiber; and decision means for deciding, based on the received scattered light, whether or not the one optical fiber is the target fiber.

10. The apparatus of claim 7 wherein said detection means comprises:

light transmitting means for transmitting an optical signal from one end of the one optical fiber to the remote location;

photoreceiver means for receiving scattered light from the one optical fiber; and decision means for deciding, based on the received scattered light, whether or not the one optical fiber is the target fiber.

11. The apparatus of claim 7 further comprising communication means for transmitting from said heat exchange means to said detection means a message that a temperature change has been effected in the set length of the one optical fiber and for transmitting from said detection means to the remote location a decision signal as to whether or not the one fiber is the target fiber.

12. The apparatus of claim 8 further comprising communication means for transmitting from said heat exchange means to said detection means a message that a temperature change has been effected in the set length of the one optical fiber and for transmitting from said detection means to the remote location a decision signal as to whether or not the one fiber is the target fiber.

13. The apparatus of claim 9 further comprising communication means for transmitting from said heat exchange means to said detection means a message that a temperature change has been effected in the set length of the one optical fiber and for transmitting from said detection means to the remote location a decision signal as to whether or not the one fiber is the target fiber.

14. The apparatus of claim 10 further comprising communication means for transmitting from said heat exchange means to said detection means a message that a temperature change has been effected in the set length of the one optical fiber and for transmitting from said detection means to the remote location a decision signal as to whether or not the one fiber is the target fiber.

* * * * *